United States Patent [19]

Uemura et al.

[11] Patent Number: 4,590,849
[45] Date of Patent: May 27, 1986

[54] BREAD TOASTER

[75] Inventors: Kichinosuke Uemura, Ibaraki; Yukio Yamaguchi, Osaka, both of Japan

[73] Assignees: Matsushita Electric Industrial Co., Ltd., Osaka; Toyo Press Co., Ltd., Itami, both of Japan

[21] Appl. No.: 650,067

[22] Filed: Sep. 13, 1984

[30] Foreign Application Priority Data

| Sep. 19, 1983 | [JP] | Japan | 58-172476 |
| Sep. 19, 1983 | [JP] | Japan | 58-172478 |
| Sep. 22, 1983 | [JP] | Japan | 58-175462 |
| Sep. 26, 1983 | [JP] | Japan | 58-177360 |
| Sep. 26, 1983 | [JP] | Japan | 58-177361 |

[51] Int. Cl.⁴ ............................................. A47J 37/08
[52] U.S. Cl. .................................... 99/331; 99/335; 99/385; 99/391
[58] Field of Search ............. 99/326, 328, 329 R, 99/331, 332, 334, 335, 389, 391, 392, 393, 385

[56] References Cited

U.S. PATENT DOCUMENTS

| 1,931,345 | 10/1933 | Fitzgerald | 99/391 X |
| 1,939,247 | 12/1933 | Avery | 99/335 X |
| 2,387,817 | 10/1945 | Wales | 99/391 X |

FOREIGN PATENT DOCUMENTS

| 628087 | 8/1949 | United Kingdom | 99/335 |
| 1069306 | 5/1967 | United Kingdom | 99/329 R |

Primary Examiner—Billy J. Wilhite
Attorney, Agent, or Firm—Spencer & Frank

[57] ABSTRACT

A bread toaster having toasting heaters facing a toasting chamber formed below a bread receiving slot. The slot merges into a notch which is formed in the upper end portion of an outer shell panel which continues integrally from the top panel. The toaster has bread supports pivotally carried by a pivot bearing which is inwardly positioned adjacent to the outer shell panel and below the notch. With this arrangement, it is possible to simplify the construction of movable parts of the toaster, including the bread supports, and, also, to stabilize the operation of the bread supports.

3 Claims, 17 Drawing Figures

BREAD TOASTER

BACKGROUND OF THE INVENTION

The present invention relates to a bread toaster for ordinary household use.

FIGS. 1, 2 in combination show a typical conventional toaster having an outer housing constituted by a top panel 2 having bread receiving slots 1 formed in the center thereof, and plastic box-shaped covers 4, 4' disposed at both longitudinal ends of the top panel 2. Inner walls 5, 5' defining a toasting chamber 3 are attached to the inner ends of the outer housing. A bread support 6 extends through the walls 5, 5' for free vertical movement. The bread support 6 is held by a lifting plate 7 adapted to be moved up and down while being guided by a guide bar 8.

In this conventional toaster, the frictional engagement between the lifting plate 7 and the guiding bar 8 is essential for attaining a stable vertical movement of the bread support 6. This frictional engagement, however, causes undesirable noise and impairs the smoothness of the vertical movement.

In some cases, the toaster is designed for toasting a variety of thicknesses of bread. An example of such a toaster is shown in FIG. 3. This toaster has an outer housing 13 composed of a top panel 9 with a bread receiving slot 10, side panels 11 attached to the top panel 9, and a bottom panel attached to the lower ends of the side panels 11. Reflective plates 15 are disposed adjacent to the outer sides of heaters 14, 14' and facing a toasting chamber in the outer housing 13. A stationary guard 16 is disposed along the inner side of the heater 14. Tension guards 17 and 18 are provided and operate in accordance with the thicknesses of the slice of bread: namely, in the case where a thick slice of bread (a) is toasted, the tension guard takes the position designated by 17, whereas, when a thin slice of bread (b) is to be toasted, the tension guard takes the position denoted by 18, so as to urge the bread to one side of the toasting chamber. Thus, the distance the slice of bread (a) or (b) and the heater 14' adjacent to the tension guards 17, 18 varies depending on the thickness $d_1$, $d_2$ of the slice of bread. Consequently, the degree of toasting differs on each side of the bread: namely, a greater difference in degree of toasting results as the thickness of the slice of bread is increased.

SUMMARY OF THE INVENTION

Accordingly, an object of the invention is to provide a toaster in which the mechanism for allowing vertical movement of the bread support is simplified to ensure a smooth and stable movement of the bread support.

Another object of the invention is to provide a bread toaster in which the free end of the bread support is received in a recess formed in the cover to realize a compact construction of the bread toaster to facilitate the accomodation of the toaster when it is not used.

Still another object of the invention is to provide a bread toaster in which a slice of bread is held by a recess formed in a bread support guard member operatively connected to the bread support and a recess formed in a member which opposes the bread support guard member, such that the slice of bread can be positioned correctly at the mid-position between two heaters facing the toasting chamber, thereby to assuring an equal degree of toasting on both sides of the bread.

DESCRIPTION OF THE PREFERRED EMBODIMENT

Figure 1:
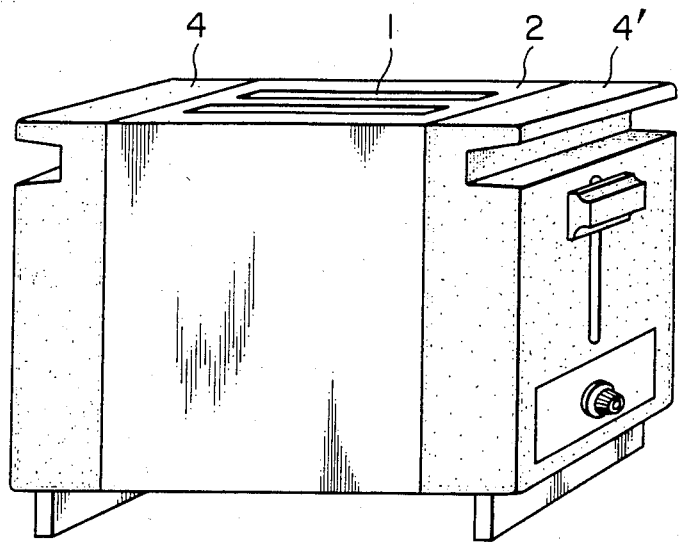
FIG. 1 is a perspective view of a conventional bread toaster.
Figure 2:
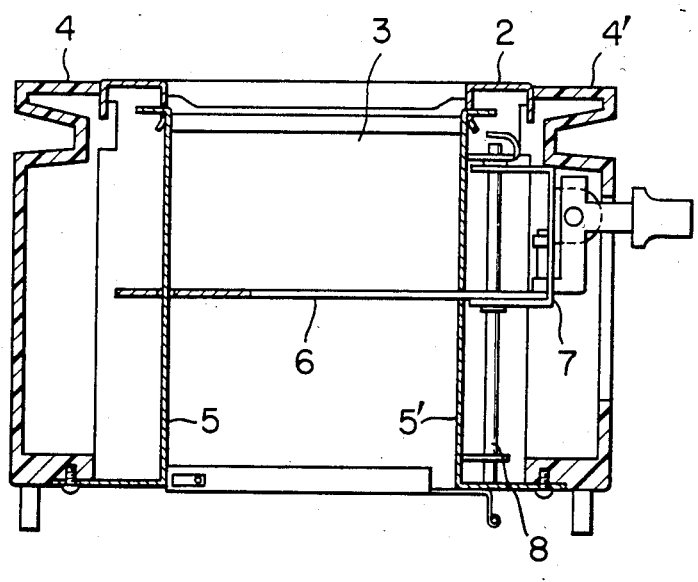
FIG. 2 is a sectional view of the toaster shown in FIG. 1.
Figure 3:
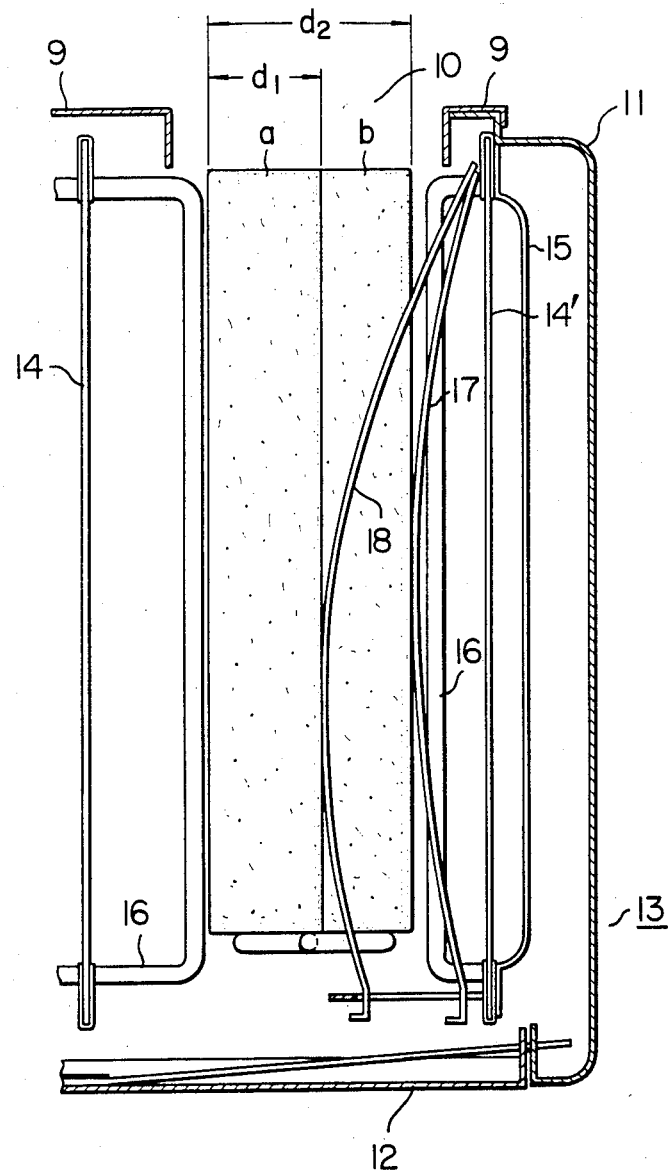
FIG. 3 is a fragmentary sectional view of another conventional bread toaster.
Figure 4:
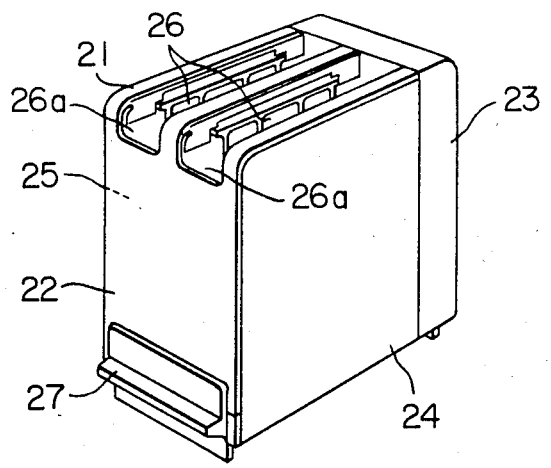
FIG. 4 is a perspective view of an embodiment of the bread toaster in accordance with the present invention.

A preferred embodiment of the invention will be described herein with reference to the drawings.

Referring to FIGS. 4 to 10, a reference numeral 21 designates a top panel having one end bent downwardly so as to form an outer shell panel 22 integral therewith. A cover 23 is attached so as to oppose the outer shell panel 22. Side panels 24 and 25 are attached to respective sides of the top panel 21 so as to oppose each other. The top panel 21, outer shell panel 22, cover 23 and side panels 24, 25 in combination constitute an outer housing of the toaster. Bread receiving slots 26, 26 are formed in the top panel 21. The ends of the bread receiving slots 26, 26 opposite the cover 23 are connected to notches 26a, 26a formed in an upper end portion of the outer shell panel 22. That is, the slots 26, 26 extend into the upper end portion of the outer shell panel 22. A reference numeral 27 designates a handle attached to a lower end portion of the outer shell plate 22.

Figure 5:
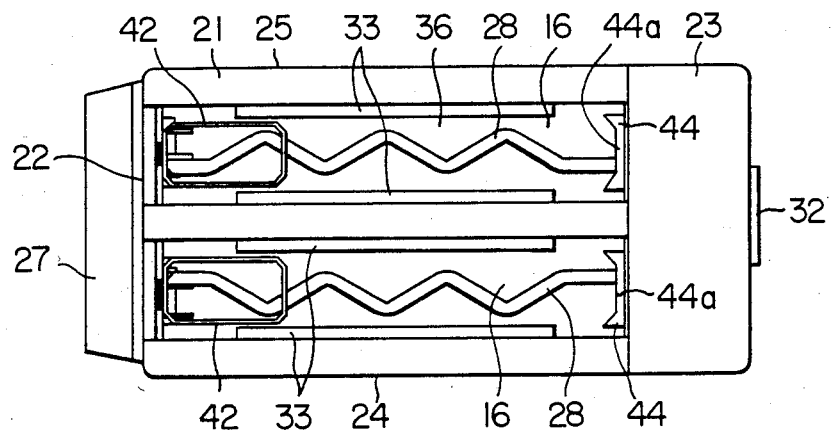
FIG. 5 is a top plan view of the bread toaster shown in FIG. 4.

Two bread supports 28 are shown in FIG. 5 and are each carred at one end thereof by pivot bearings 29 which are provided on an inner surface of the outer shell panel 22 at a position as close as possible to the lower end portion of the outer shell plate 22. A reference numeral 30 designates a lifting lever which is rotatably supported by free ends of the bread support 28. The lifting lever 30 is continually being urged upwardly by a lifting spring 31 with its end projecting outwardly from the cover 23. A lifting knob 32 is attached to the end of the lifting lever 30 which projects from the cover 23. Toasting heaters 33 are mounted substantially in parallel with the side panels 24, 25 which constitute part of the outer housing of the toaster as shown in FIG. 5. Heater guides 34 are disposed so as to cover the heaters 33. A bottom panel 35 constitutes the bottom of the outer housing of the toaster. This bottom panel 35 closes the lower side of a toasting chamber 36. This bottom panel 35 can be opened as desired to make the toasting chamber 36 accessible from the lower side thereof.

A reference numeral 37 designates an adjusting knob for adjusting the degree of toasting, while a numeral 38 designates a hook for holding the lifting lever 30. The hook 38 is adapted to be reset by a solenoid 39.

Figure 6:
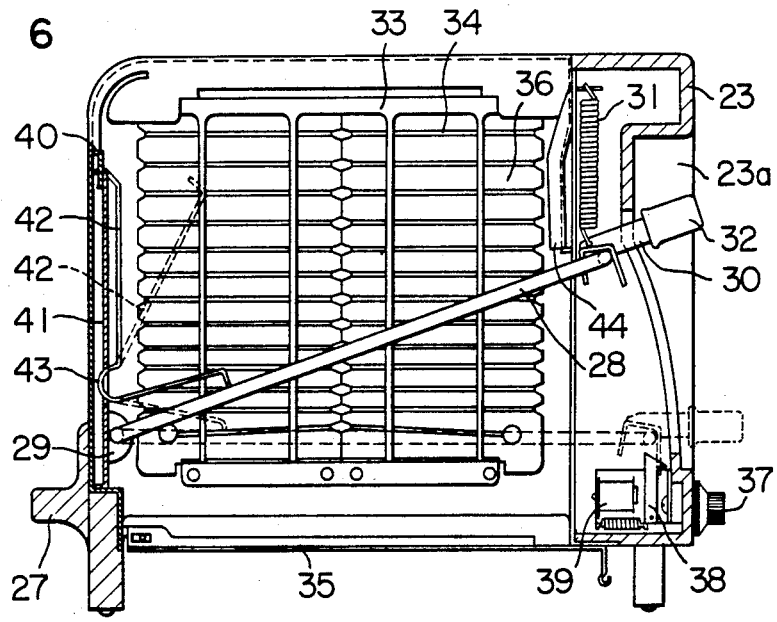
FIG. 6 is a sectional view of the bread toaster shown in FIG. 5.

A recess 23a is formed in the outer side of the cover 23 as shown in FIG. 6. The recess 23a has a depth such that most of the knob 32 is accomodated within recess 23a when this knob 32 is moved in accordance with the swinging of the bread support 28.

As shown in FIG. 6, the ends of the aforementioned notches 26a formed in the upper end portion of the outer shell plate 22 are bent inwardly to constitute a mounting portion 40 to which is secured a bread support carrier plate 41. The pivot bearing 29 mentioned before is formed on the carrier plate 41 integrally therewith. Bread support guard members 42, each having a substantially U-shaped form and each having a substantially L-shaped side elevation, have rotary portions 43 rotatably secured to the bread support carrier plate 41. As most clearly shown in FIGS. 7-9, the bread support guard members 42 are provided at their lower and upper portions with recesses 42a and 42b having tapered portions such that the widths of the bottoms of the recesses are progressively decreased.

In FIG. 6, continuous lines show the bread supports 28 and the bread support guard members 42 in the state for lifting the bread slices, while broken lines show those members in the state where the bread slices are in the toasting position.

Substantially U-shaped members 44 are attached to the walls of the toasting chamber 36 and oppose the bread support guiding member 42.

In operation, for toasting the bread, the desired toasting degree is set by means of the degree of toasting adjusting knob 37. A piece of bread is placed on one bread support 28 and the lifting lever 30 is lowered, so that a power switch is turned on to supply electric power to the toasting heaters 33. Consequently, the lifting lever 30 engages the hook 38 and is held in the position shown by continuous lines in FIG. 7. When the bread has been toasted to the desired degree set by the toasting degree adjusting knob 37, the solenoid 39 is supplied with electric power so that the hook 38 is attracted thereto and is disengaged from the lever 30. Consequently, the bread supports 28 rotate upwardly, so as to be reset to the position shown by broken lines in FIG. 7, by the force of the lifting spring 31 and, at the same time, the power supply to the toasting heaters 33 is disengaged. The thus toasted bread is ejected through the bread receiving slot 26. Because of the presence of the notch 26a in the outer shell panel 22 continuing from the slot 26, corner A of the bread comes out of the notch 26a so that the bread can be ejected without interference from any part of the toaster.

As will be understood from the foregoing description, according to the invention, the action of each bread support 28 relies upon a swinging motion around the pivot bearing 29, so that linear frictional sliding motions are reduced by the simplified construction of the moving part, including the bread support 28, while the generation of undesirable noise is suppressed. Furthermore, the stability of operation of the bread support 28 is improved advantageously. When the bread toaster of the invention is stored after use, the bread supports 28 are disengaged from the hook 38 and rotated upwardly, so that the lifting knob 32 is accomodated substantially within the recess 23a in the cover 23, so that the toaster as a whole becomes compact to thereby facilitate storage.

Figure 7:
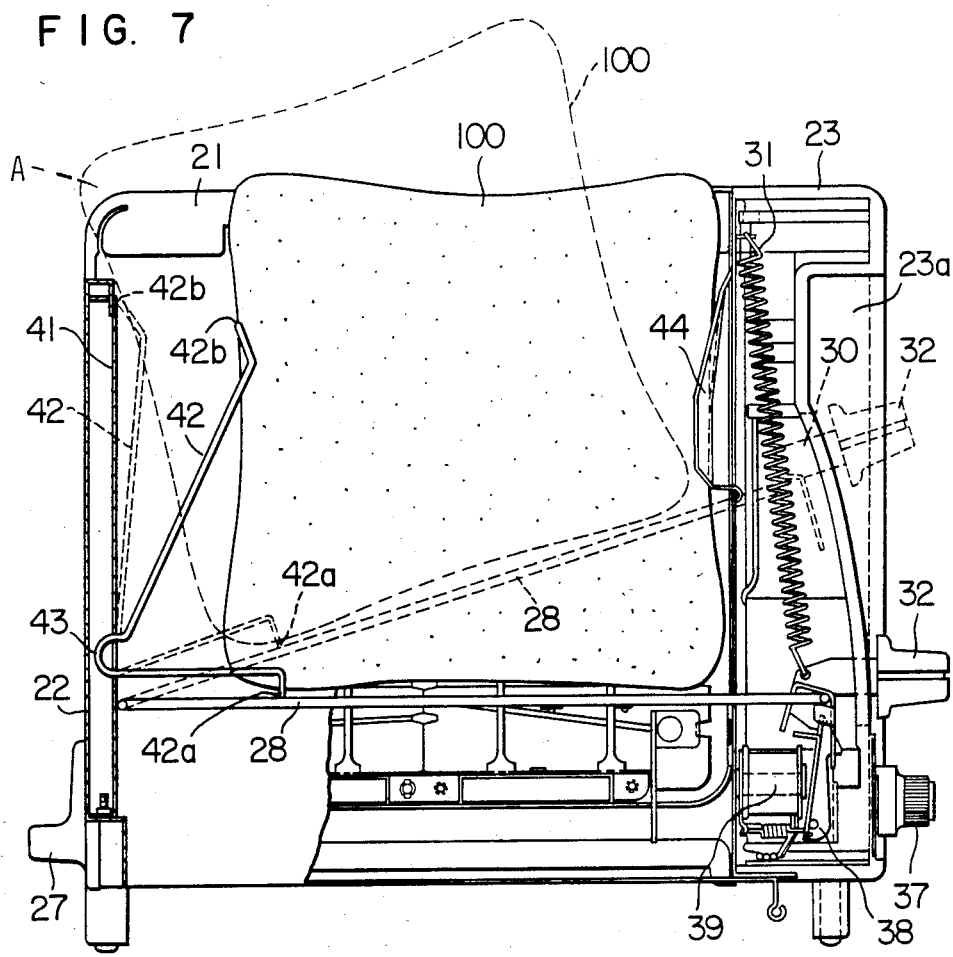
FIG. 7 is a sectional view of the toaster shown in FIGS. 4-6 in the state of receiving and the state of toasting a slice of bread.
Figure 8:
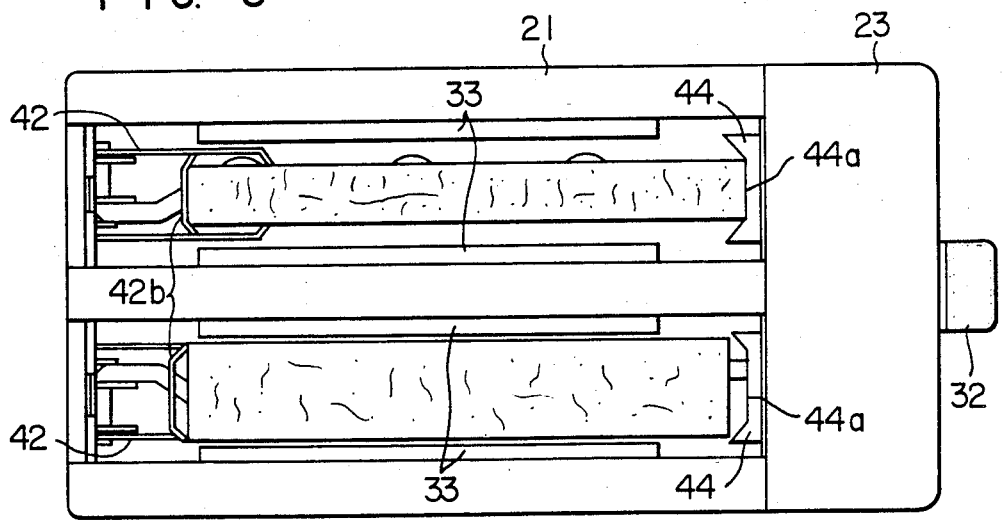
FIG. 8 is a top plan view of the toaster shown in FIGS. 4-7 in the state of receiving a thin slice of bread and a thick slice of bread.
Figure 9:
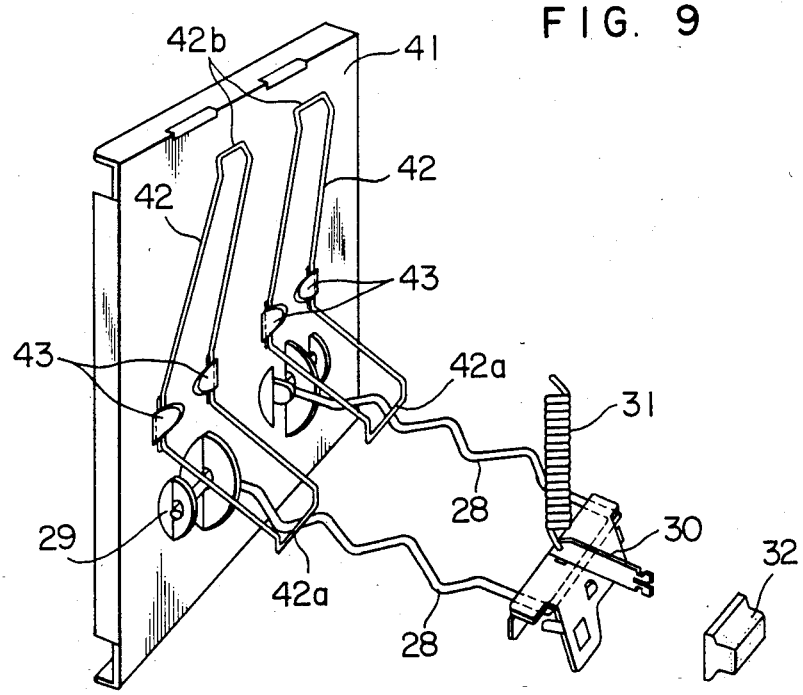
FIG. 9 is an exploded perspective view of a bread support and a bread support guard member.
Figure 10:
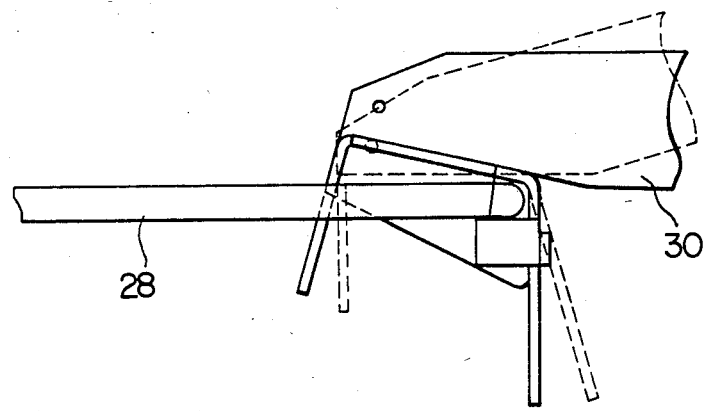
FIG. 10 is an enlarged view of a lifting lever.
Figure 11:
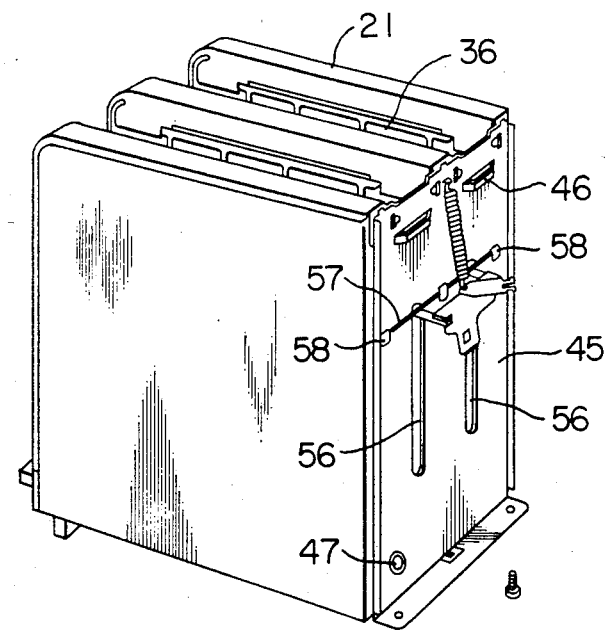
FIG. 11 is a perspective view of a toaster with its cover removed.
Figure 12:
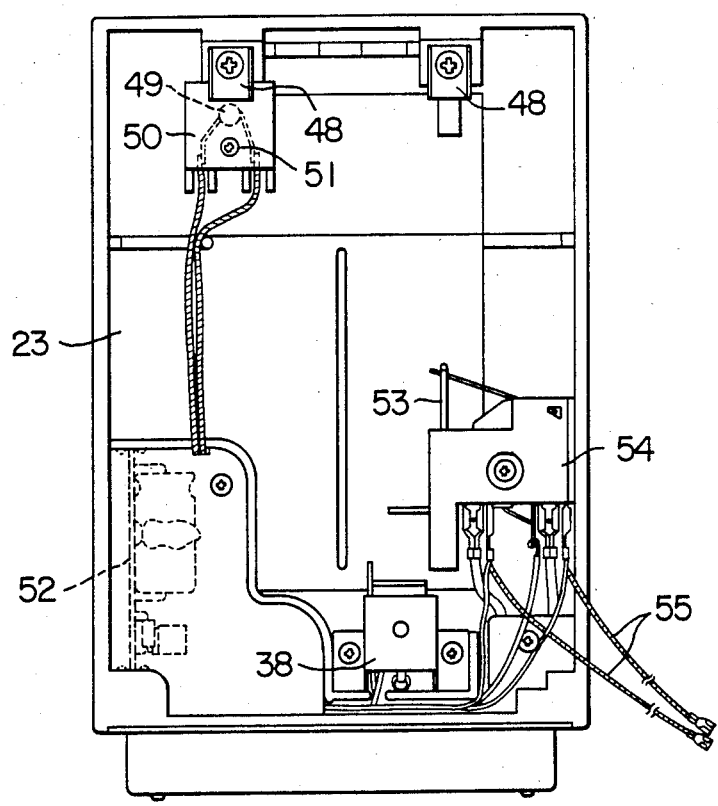
FIG. 12 is a elevational view of the cover.
Figure 13:
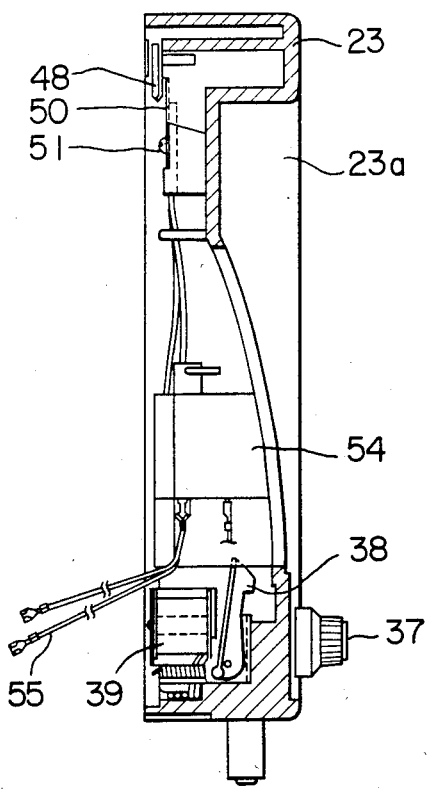
FIG. 13 is a sectional view of the cover.

The bread toaster of the invention can be used for toasting equally both sides of sliced breads of various thicknesses, as will be understood from the following description taken in conjunction with FIGS. 7 and 8.

Referring first to FIG. 7, a slice of bread 100 is put into the toasting chamber 36 as indicated by broken lines, and is received by a recess 42a in the lower portion of the bread support guard member 42 which in this state takes the position as shown by the broken lines. Then, lifting lever 30 is depressed from the position indicated by the broken lines to bring the bread support 28 to the toasting position shown by the continuous lines. At the same time, the bread support guard member 42 is moved to the position shown by the continuous lines, by the weight of the slice of bread 100. In this state, slice of the bread 100 is toasted while being held by recess 42b in the upper portion of the bread support guard member 42 and by recess 44a in the U-shaped member 44 which is attached to the upper part of the wall of the toasting chamber 36 opposed to the bread support guard member 42.

In the case where the sliced bread has a small thickness, it is held by upper recess 42b in the bread support guard member 42 and by recess 44a in the U-shaped member 44, as shown in FIG. 8. On the other hand, when the sliced bread is thick, it is held by the tapered portion of the recess 42b in the bread support guard member 42. Consequently, the bread support guide member 42 serves to reliably position and hold the sliced bread at the mid-position between the two toasting heaters 33 which face the toasting chamber 36, regardless of the thickness of the bread. Consequently, both sides of the sliced bread are toasted to an equal degree of toasting.

FIGS. 11 to 17 shown another embodiment of the invention. In the drawings, a reference numeral 45 denotes a main body which is connected to the top panel 21. The main body 45 is provided along its upper portion with protrusions 46 cut and raised therefrom. A hole 47, communicating with the toasting chamber 36, is formed in a lower portion of the main body 45. As will be seen from FIG. 12, the cover 23 is provided with projections 48 adapted to be retained by the protrusions 46 on the main body 45. A thermistor 49, for sensing the temperature in the toasting chamber 36, is secured to a portion of the main body below the projections 48, by means of an insulating plate 50. A clearance large enough to clear each protrusion 46 on the main body 45 is left between the insulating plate 50 and the projections 48 so as not to hinder the engagement between each respective projection 48 and protrusion 46. In order to attain a high temperature sensitivity for the thermistor 49, the thickness of the insulating plate 50 is made preferably small. Since the protrusions 46 on the main body 45 serve to press upon the insulating plate 50, the insulating plate 50 can be easily and securely attached by a single screw 51 which is screwed to a lower portion of the insulating plate 50.

The following parts are disposed on the lower inner side of the cover 23: a control circuit 52, which cooperates with the thermistor 49 to electrically determine the toasting time, a hook 38 for retaining the lifting lever 30 and, hence, the bread supports 28, and a switch 54, which is adapted to be opened and closed by means of a crank bar 53, which in turn is actuated by the lowering of the bread supports 28. The switch 54 is electrically connected to the toasting heaters 33 through lead wires 55 which are led past the hole 47 formed in the lower portion of the main body 45. A reference numeral 56 designates through bores formed in the main body 45 and receiving the bread supports 28 for free vertical movement therethrough. A stopper pin 57, for gently stopping the upward swinging of the bread support 28, is provided along the upper ends of the through bores 56.

Figure 14:
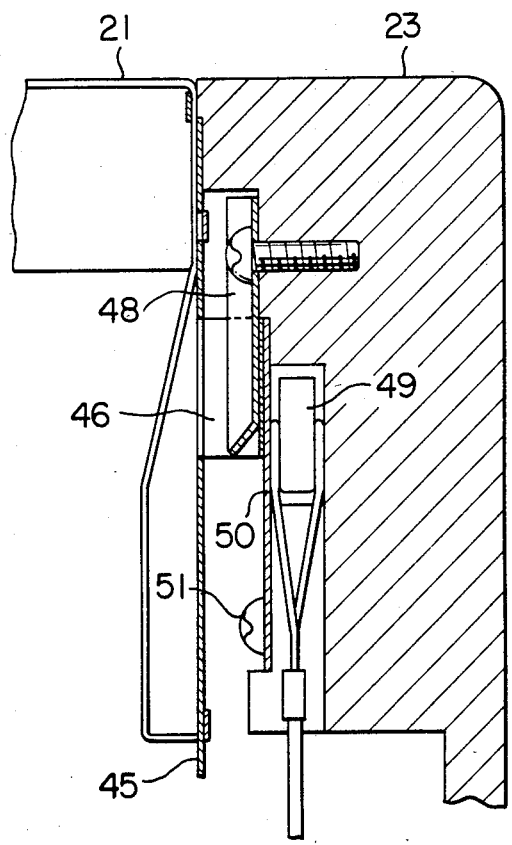
FIG. 14 is a sectional view of a temperature sensing section.
Figure 15:
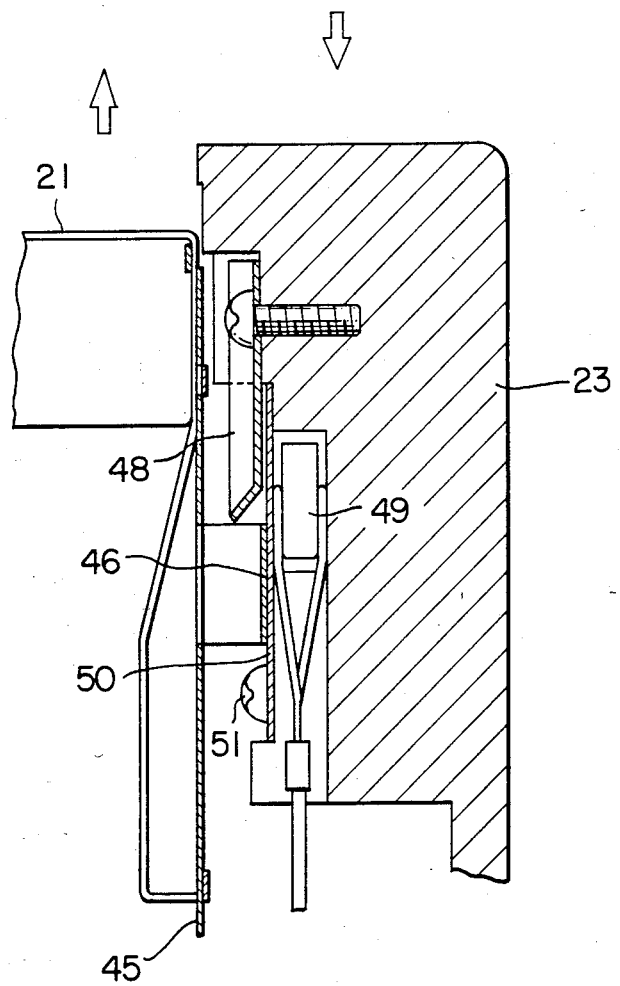
FIG. 15 is a sectional view illustrating the assembling procedure.

An explanation will be made herein as to how the cover 23 is attached to the main body 45. Referring to FIGS. 14 and 15, the protrusions 46 of the main body 45 are slid from the lower side of the projections 48 on the upper part of the cover 23 so as to fit in the gap between the projections 48 and the insulating plate 50. With this arrangement, the thermistor 49 can be fixed securely even when the insulating plate 50 is sufficiently thin, by the combination of the fixing by the screw 51 and the pressing by the protrusion 46 of the main body 45. Consequently, the temperature in the toasting chamber 36 can be detected exactly by thermistor 49.

The cover 23 carries, at its inner side, the control circuit 52 and the switch 54, as well as the temperature sensing means, such as the thermistor 49, for sensing the temperature in the toasting chamber 36, and since the thermistor 45 is held in heat-transmitting contact with the main body 45, the toaster can be assembled easily and the temperature sensing accuracy can be enhanced, advantageously.

Figure 16:
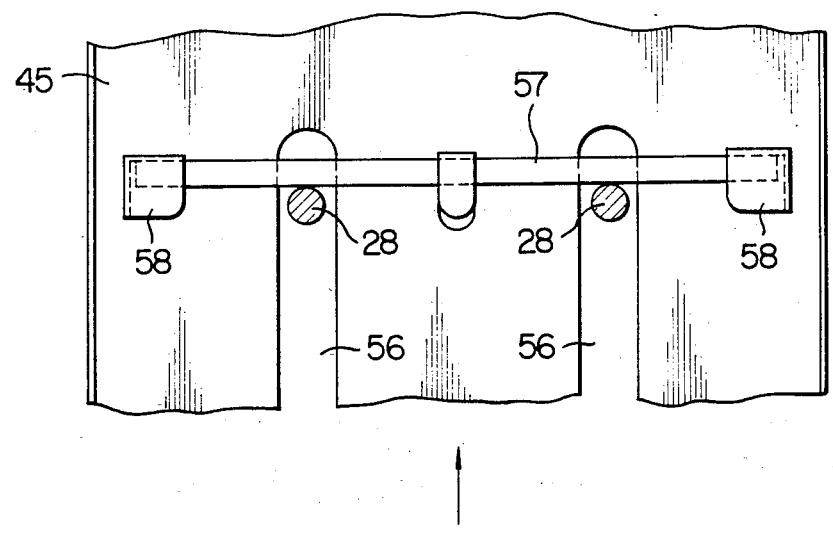
FIG. 16 is an enlarged view of a stopper pin section.
Figure 17:
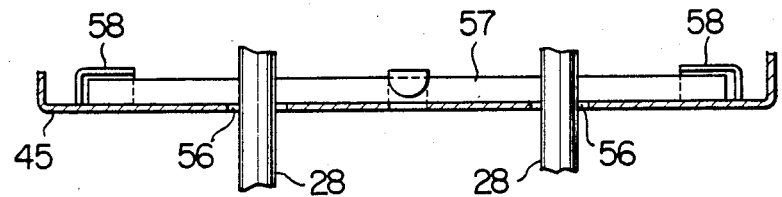
FIG. 17 is a sectional view as viewed in the direction of the arrow of FIG. 16.

Furthermore, since a stopper pin 57 for stopping the bread support 28 is provided along the upper ends of the through bores 56 formed in the main body 45, the upward swinging of the bread supports 28, caused by the lifting spring 31, is resiliently stopped and the impact thereof absorbed by the resiliency of the stopper pin 57, which is made of, for example, a resilient wire. The stopper pin 57, made of a wire material can be easily made by cutting a blank wire. The attaching of the stopper pin 57 is also easy: namely, it can be affixed simply by being inserted into a cut-out 58 formed in the main body 45 as shown in FIGS. 16 and 17. The impact absorbing effect of the stopper pin 57 can be changed as desired by varying the diameter of the wire.

What is claimed is:

1. A bread toaster, comprising:
   an outer housing having a toasting chamber therein and including
      a top panel, said top panel having at least one bread receiving slot formed therein;
      an outer shell panel extending downwardly from a first edge of said top pane, said outer shell panel having at least one notch formed therein, said notch connecting with said bread receiving slot and extending downwardly from said top panel for a distance equal to less than half the total height of said outer shell panel; and
      a cover extending downwardly from a second edge of said top panel opposite said first edge and substantially parallel to said outer shell panel;
   pivot bearing means mounted on an inner lower portion of said outer shell panel below said notch;
   at least one bread support disposed below said bread receiving slot, said bread support having a first end pivotally mounted on said pivot bearing means, and a second end;
   toasting heaters positioned vertically within said toasting chamber and displaced laterally from said bread support; and
   at least one bread support guard member disposed in the vicinity of said pivot bearing means so as to operate in relation to the pivotal movement of said bread support, said bread support guard member having tapered side edges and a recess defined by said tapered side edges, which side edges converge towards the bottom of said recess, whereby a bread slice to be toasted is positioned at the mid-position between two toasting heaters.

2. A bread toaster, comprising:
   an outer housing having a toasting chamber therein and including
      a top panel, said top panel having at least one bread receiving slot formed therein;
      an outer shell panel extending downwardly from a first edge of said top panel, said outer shell panel having at least one notch formed therein, said notch connecting with said bread receiving slot and extending downwardly from said top panel for a distance equal to less than half the total height of said outer shell panel;
      a main body extending downwardly from a second edge of said top panel opposite said first edge and substantially parallel to said outer shell panel; and
      a cover positioned outwardly of and in parallel to the main body to which the cover is mounted;
   pivot bearing means mounted on an inner lower portion of said outer shell panel below said notch;
   at least one bread support disposed below said bread receiving slot, said bread support having a first end pivotally mounted on said pivot bearing means, and a second end, and said cover having a recess provided along an outer portion thereof for receiving said second end of said bread support, whereby the pivotal movement thereof is accommodated within said outer housing;
   toasting heaters positioned vertically within said toasting chamber and displaced laterally from said bread support;
   a temperature sensing means mounted on said cover for sensing the temperature in said toasting chamber; and
   a control section mounted on said cover, said control section controlling the supply of electrical power to said toasting heaters.

3. A bread toaster according to claim 2, wherein at least one through bore is provided in the main body for receiving the second end, whereby the pivotal movement upwardly and downwardly thereof is accommodated; and wherein a stopper pin comprised of a resilient wire is provided along the upper end of said through bore, whereby the upward movement of said second end is resiliently stopped and the impact thereof absorbed.

* * * * *